Aug. 28, 1934.   L. JOHNSON ET AL   1,971,413
MEANS FOR OPERATING A PORTABLE STACKER
Filed Feb. 29, 1932   2 Sheets-Sheet 2
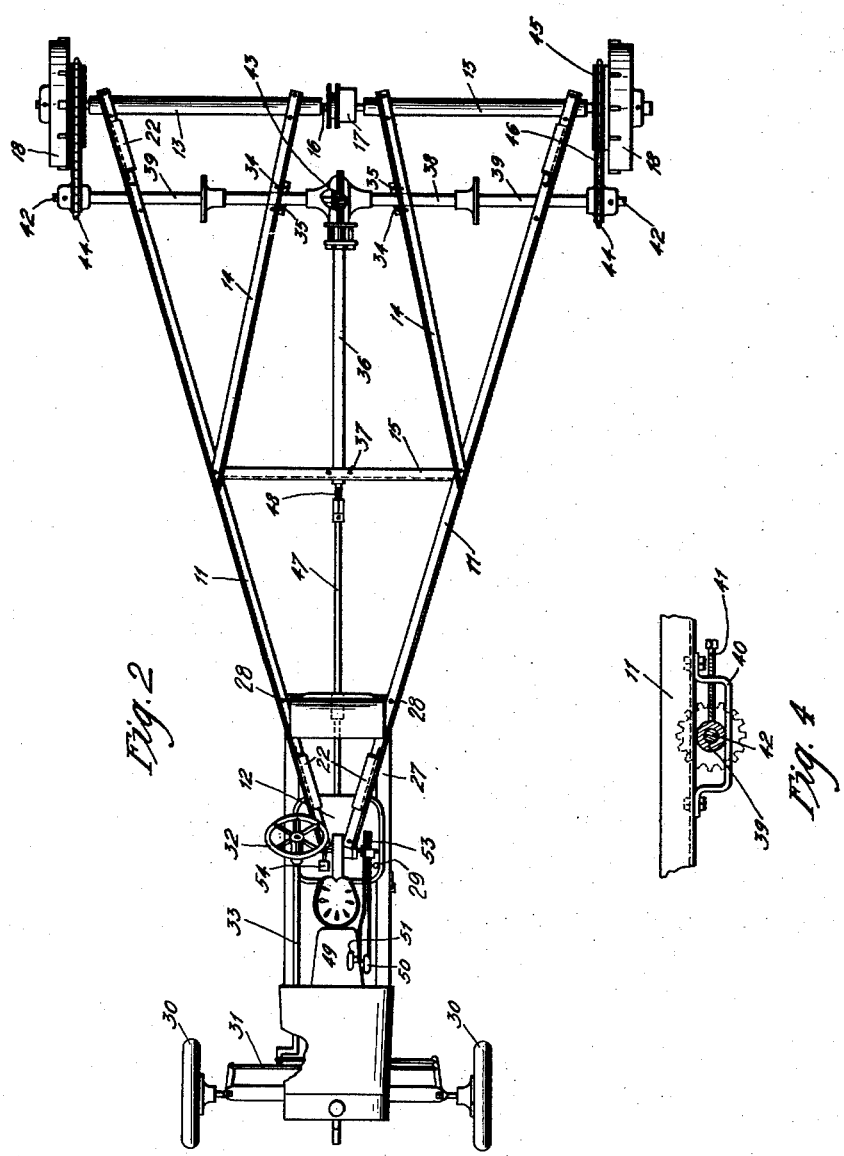
Inventors
Louie Johnson
John L. Mack
by Orwig & Hague Attys.

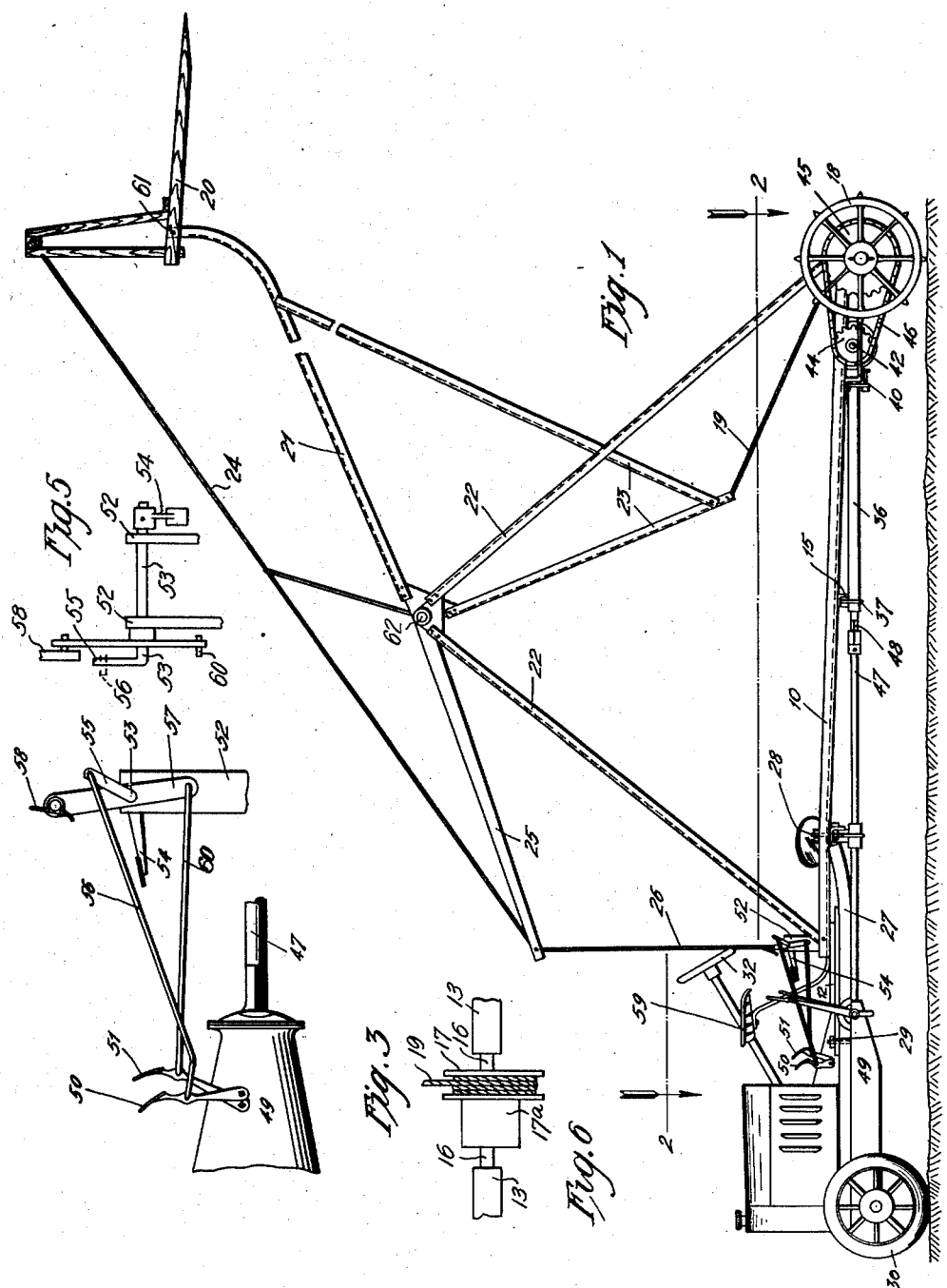

Patented Aug. 28, 1934

1,971,413

UNITED STATES PATENT OFFICE 1,971,413

MEANS FOR OPERATING A PORTABLE STACKER

Louie Johnson and John L. Mack, Jolley, Iowa

Application February 29, 1932, Serial No. 595,829

3 Claims. (Cl. 180—1)

This invention relates to portable hay stackers of that type employing a portable frame and supporting a sweep rake with mechanism for elevating and lowering the rake whereby the rake is first lowered to the ground surface to gather up the punched hay, after which the rake is elevated a slight distance above the ground surface, and the entire load carried to a stack or wagon, after which the rake is further elevated to position over the stack and then dumped, the elevation of the rake being accomplished by drum and cable mechanism operated by two wheels supported under the rake suporting end of the frame, the opposite end of the frame being mounted on a caster wheel and propelled by draft animals from the rear end. A rake of this type is very efficient in its operation, but one difficulty has been experienced in that it is awkward to move about over the ground surface when animals are employed for propelling the frame, to such an extent that this type of hay rake has not been so extensively used as would otherwise have been.

A hitch device has also been designed and substituted for the caster wheel so that the rear end of the stacker frame is pivotally conected to the front end of a tractor. This is a very awkward device to operate, due to the fact that the load is pushed ahead of the tractor and due to the fact that the tractor is located about eighteen feet back of the point where the rake is supported, so that the steering operation becomes very difficult, inasmuch as there is a constant tendency of the backing of the stacker frame to swing around to either one side or the other as the load is applied for filling the rake. Difficulty is also experienced in handling the stacker at the stack.

It is, therefore, the object of our invention to provide improved means for propelling a hay stacker of the type above described, whereby the handling and steering of the stacker over the ground surface may be more easily accomplished.

More specifically it is the object of our invention to provide a power device which may be easily and quickly attached to the stacker frame, and when so applied provide means for applying the tractive force of the tractor frame at its forward end rather than at its rear end, whereby the steering and controlling of the tractor frame may be more easily accomplished.

A further object of our invention is to provide means for propelling a hay stacker of the type above described, in which is utilized a portion of the chassis of an automobile including the engine and the transmission gears for providing power, while the steering mechanism of the automobile is employed for steering the stacker frame, and so arranged that the steering wheels of the automobile will also carry the weight of the rear end of said stacker frame. The rear axle housing and the differential gears carried thereby are also utilized to provide a suitable transmission device for transmitting power from the engine to the wheels of the stacker.

Our invention consists in the construction, arrangement and combination of the various parts of the device, whereby the objects contemplated are attained, as hereinafter more fully set forth, pointed out in our claims, and illustrated in the accompanying drawings, in which:

Figure 1 is a side elevation of a stacker of the type above described, showing the manner in which our improved power device is applied thereto.

Figure 2 is a sectional view taken on the line 2—2 of Figure 1.

Figure 3 is an enlarged detail view of the auxiliary controlling mechanism.

Figure 4 is a detail view of the chain tightener used in connection with the auxiliary power device.

Figure 5 is a front view of Figure 3.

Figure 6 is an enlarged detail view of the cable drum and drum shaft for elevating the stacker fork, with the drum control mechanism omitted.

Referring to the accompanying drawings, the numeral 10 indicates generally the supporting frame of a hay stacker, said frame comprising side members 11 having their ends secured to a plate 12. Said members 11 diverge outwardly from each other and have their forward ends connected to an axle housing 13. Brace members 14 are provided having their forward ends connected to the axle housing 13 and their rear ends to the central portion of the members 11. Transversely arranged beam 15 is provided at the intersecting points of the members 11 and 14.

The housing 13 is provided with an axle 16 having at its central portion a drum 17 and controlling mechanism therefor supported within the housing 17a. The controlling mechanism is not illustrated inasmuch as it forms no part of this invention said controlling mechanism being a part of the stacker construction to which this improvement is attached. On each end of the shaft 16 is a tractor wheel 18, said wheels being so arranged as to rotate the drum 17, which in turn carries a cable 19 for elevating and lowering the stacker rake 20, said rake being pivoted to the frame 21 by pivots 61 which in turn is pivoted to a stand 22 by pivots 62. The frame 21 has downwardly extending arms 23, to which one end of the cable 19 is attached, and so arranged that as the cable 19 is wound or unwound from the drum 17, the lower ends of the members 23 will be oscillated forwardly or rearwardly, and the forward end of the frame 21 elevated and lowered, which in turn will cause the rake 20 to be elevated and lowered. The said rake 20 is controlled by means of a cable 24 passing over the rear end of a suitable beam 25 mounted on the pivot 62, the rear end of the lever 25 is provided with a cable 26 extending to suitable control levers not shown.

By this construction it will be seen that if the rake 20 is in its lowered position, then the lower ends of the members 23 will be moved to their rear position of movement, and that the said rake will be elevated by simply winding the cable 19 on the drum 16, power being supplied through the traction wheels 18.

The plate 12 of the frame 10 is usually supported on a caster wheel and suitable doubletrees or similar devices applied to said plate, whereby the frame is advanced over the ground surface by animals attached to said doubletree. As shown in the drawings, this caster wheel and doubletree arrangement has been removed and the plate 12 supported by the rear end of an automobile frame 27, from which the rear axle housing, the torsional tube and the rear wheels have been removed. The rear end of the frame 27 is secured to the frame 10 by means of suitable bolts 28 and 29. The weight of the rear end of the frame 10 is carried by the front wheels 30 of the automobile frame, said frame being steered by the steering mechanism 31, which includes the steering wheel 32 and the shaft 33.

The rear axle housing and the torsional tube of the automobile are then secured to the brace members 14 by means of bolts 34 and a plate 35. The free end of the torsional tube 36 is secured to the member 15 by means of a U-bolt 37. The axle housing is designated by the numeral 38. The regular axles of said housing are removed and tubular members 39 inserted in the ends of the housing. Said tubular members are mounted in guide devices 40 secured to the under surface of the frame memebrs 11, in the manner shown in Figure 4. Set screws 41 are provided for moving said tubular members forwardly for tightening the chains hereinafter described.

Supported in each of the members 39 is a shaft 42, said shafts having their inner ends operatively connected with differential gears 43 carried by the housing 38. The outer ends of the shafts 42 terminate immediately behind the wheels 18, and each is provided with a sprocket pinion 44. A sprocket gear 45 is secured to the inner surface of each of the wheels 18, and in alinement with the sprockets 44. A chain 46 is provided for each corresponding set of sprocket pinions and gears.

The torsional shaft of the tube 36 may be retained, if so desired, in which case an extension shaft 47 is provided for operatively connecting the free end of the torsional shaft 48 with the transmission gears of the gear housing 49, which forms a part of the automobile engine, not illustrated.

Thus it will be seen that means is provided whereby power from the automobile engine may be utilized for rotating the wheels 18, and whereby power will be applied to the forward end of the stacker instead of the rear end, as heretofore has been the practice.

By this arrangement it will be seen that the rear end of the automobile frame is connected to the rear end of the stacker frame in such manner that the steering wheels of the automobile frame will be on the rear end of the machine as it is advanced for filling the rake 20, and that the operator will be seated with his back toward the automobile engine, so that an auxiliary lever and link device is necessary for controlling the clutch pedal 50 and the reverse gear pedal 51.

This mechanism comprises standards 52 in which a rock shaft 53 is rotatively mounted, the inner end of which is provided with a pedal arm 54, said arm being fixed to the shaft 53. The outer end of the shaft 53 terminates in a crank portion 55, to which one end of a link 56 is pivotally connected. The opposite end of said link is pivotally connected with the pedal 50.

Rotatively mounted on the outer end of the shaft 53 is a lever 57 to which one end of a link 60 is pivotally connected to its lower end, the other end of said link being pivotally connected to the pedal 51. The upper end of the lever 57 has a foot pedal 58. Said pedals 54 and 58 are located ahead of the seat 59 in such position as to be conveniently reached by the operator, and whereby the operator may sit with his face toward the forward end of the stacker frame in such position as to easily grasp the control levers on said frame.

Thus it will be seen that we have provided a cheap and efficient power device for operating the stacker frame, which may be constructed of an out-of-date automobile frame having a comparatively good engine, which may be purchased for a small sum, and whereby by the addition of a comparatively small amount of mechanism it may be utilized for power purposes in which the power may be applied to the forward end of the stacker frame instead of the rear end, and whereby the transmission gears of the automobile engine may be utilized to vary the speed of the stacker frame or for reversing it.

We have found in actual practice that a stacker thus supported is very easy to handle and control.

It will further be seen that while in the drawings we have illustrated the power device as being formed of automobile parts, it will readily be seen that an especially designed auxiliary frame and transmission mechanism for this purpose may be substituted without departing from the spirit of this invention.

The drawings illustrate the attachment as applied to a stacker already in use. It will readily be seen that the power mechanism may be included in a newly constructed stacker frame by slight mechanical modifications.

We claim as our invention:

1. The combination of an implement frame, traction wheels supporting the forward end of said frame, an automobile frame including steering wheels and a transmission gear mechanism, said gear mechanism including clutch and gear controlling levers, means for connecting the rear end of said implement frame to the rear end of said automobile frame, means for transmitting power from said transmission gear mechanism to the traction wheels, auxiliary foot actuated lever mechanism connected to said control levers for actuating the same, whereby the operator may conveniently sit facing the rear end of the automobile frame for actuating said auxiliary foot actuated lever mechanism and steer the implement frame to operate forwardly.

2. In a device of the class described, the combination of an automobile frame having a steering wheel and a gear casing provided with a clutch pedal and a gear change pedal, a seat placed in front of said steering wheel and back of said pedals, auxiliary foot actuated lever mechanism connected to said pedals for actuating the same placed in front of said seat and below said steering wheel, an implement frame connected with the rear end of said automobile frame, traction wheels for said implement frame, and means for operatively connecting said traction wheels with gear mechanism within said gear casing.

3. The combination of an implement frame, traction wheels supporting the forward end of said frame, an automobile frame including steering wheels and a transmission gear mechanism, said gear mechanism including a clutch controlling lever, means for connecting the rear end of said implement frame to the rear end of said automobile frame, means for transmitting power from said transmission gear mechanism to the traction wheels, auxiliary foot actuated lever mechanism connected to said control lever for actuating the same, whereby the operator may conveniently sit facing the rear end of the automobile frame for actuating said auxiliary foot actuated lever mechanism and steer the implement frame to operate forwardly.

LOUIE JOHNSON.
JOHN L. MACK.